3,337,404
EFFERVESCENT POTASSIUM COMPOSITION
Gerald P. Polli, Norristown, Clyde E. Shoop, Lansdale, Thomas J. Macek, Baederwood, and Wayne M. Grim, Chalfont, Pa., assignors to Merck & Co., Inc., Rahway, N.J., a corporation of New Jersey
No Drawing. Filed June 28, 1965, Ser. No. 467,708
2 Claims. (Cl. 167—57)

This invention relates to potassium compositions and more particularly to a palatable potassium chloride composition useful in postassium replacement therapy.

It is often desirable and sometimes necessary to administer potassium ion to patients who for reasons of other illness or malnutrition suffer from a lack of this important material. Many times the need for potassium replacement therapy arises from its loss from the alimentary tract due to vomiting and diarrhea caused by illness or disease. It is also lost sometimes as a result of necessary therapeutic treatment. It is highly desirable during potassium replacement therapy to coadminister chloride ion to the patient. It is frequently true that patients suffering from a lack of potassium ion are in fact simultaneously suffering from a chloride ion deficiency. Similarly, solutions at desired levels of KCl, which contain both potassium ions and chloride ions, possess an objectionable salty taste. Attempts to mask or change the salty taste of a joint solution of potassium ions and chloride ions at the desired levels of KCl have met with little or no success.

Difficulties have arisen with the administration of necessary amounts of potassium ion as KCl in solution form to patients due to the unpalatable salty taste. This undesirable property makes oral administration of potassium ion as KCl unsuitable for some patients, sometimes causing them anorexia, nausea and vomiting.

An additional difficulty has been encountered due to the often unpredictable disintegration and dissolution of KCl in the alimentary track when administered orally in solid form. It has been demonstrated that the use of solid potassium compounds is sometimes not effective for introducing the needed amount of potassium ion to the patient. The solid KCl is irritating to the stomach and is often poorly dissolved in the stomach causing extensive contact between solid KCl particles and the stomach lining.

Attempts to introduce potassium as KCl undissolved into the alimentary tract as an enteric coated pharmaceutical also may not be satisfactory. Enteric coated tablets are often unpredictably dissolved so it is difficult to design such as tablet in a manner that will prevent dissolution or disintegration of the tablet in the stomach yet do so readily in the intestine for the patient to receive the necessary potassium ion.

It is therefore an object of this invention to provide a palatable potassium chloride product which may be administered orally in solution form for effective potassium replacement therapy.

It is a further object of this invention to provide a potassium containing composition which when administered orally in solution form causes little or no irritation to the mouth and throat or gastric disturbance to a patient when administered for potassium replacement therapy.

It is also an object of this invention to provide a composition useful in potassium replacement therapy which contains chloride ion.

It is a further object of this invention to provide a potassium containing composition which when administered in solution form has no unpleasant salty taste.

It has been discovered that solutions prepared from water and an effervescent composition containing effective amounts of potassium bicarbonate and potassium chloride in combination with a suitable non-irritating, non-toxic solid acid may be employed in potassium replacement therapy. By the use in potassium replacement therapy of such a palatable potassium containing solution relatively large concentrations of the requisite ions can be absorbed from the alimentary tract.

When the composition according to this invention is added to water, the resultant effervescent solution is adapted to completely cover the otherwise objectionable salty taste which in the past has sometimes resulted in anorexia, nausea and vomiting. This composition enables a single preparation of potassium ion to be administered in solution form thereby resulting in the absorption of a high concentration of potassium ions without gastric disturbance. This rapid absorption of potassium ion provides for an effective method of potassium replacement therapy.

Preparations made according to this invention may employ various other flavor masking agents. It has been noted that these masking agents are rendered useful in the composition according to this invention due to the initial masking of the salty flavor by the effervescence released through the action of potassium bicarbonate with a suitable acid as the composition is dissolved in water.

The following are examples of compositions prepared according to this invention which are both palatable and effective in potassium replacement therapy.

*Example 1*

| | Per 10 doses, gm. |
|---|---|
| Potassium bicarbonate | 6.4 |
| Potassium chloride | 4.25 |
| Citric acid | 2.5 |
| Sodium saccharin | .25 |
| Sucrose | 6.10 |

*Example 2*

| Potassium bicarbonate | 5.10 |
|---|---|
| Potassium chloride | 5.70 |
| Citric acid | 2.50 |
| Sodium saccharin | .25 |
| Sucrose | 6.45 |

*Example 3*

| Potassium bicarbonate | 6.40 |
|---|---|
| Potassium chloride | 4.75 |
| Citric acid | 2.50 |
| Sucrose | 6.35 |

*Example 4*

| Potassium bicarbonate | 6.40 |
|---|---|
| Potassium chloride | 4.75 |
| Citric acid | 2.50 |
| Sucrose | 6.10 |
| Sodium cyclamate | .25 |

*Example 5*

| | Per 10 doses, gm. |
|---|---|
| Potassium bicarbonate | 6.40 |
| Potassium chloride | 4.75 |
| Citric acid | 2.50 |
| Soium saccharin | .10 |
| Sucrose | 6.25 |

*Example 6*

| Potassium bicarbonate | 5.20 |
|---|---|
| Potassium chloride | 3.75 |
| Citric acid | 2.0 |
| Sodium saccharin | .25 |
| Dextrose | 6.0 |

Example 7

| | |
|---|---|
| Potassium bicarbonate | 6.75 |
| Potassium chloride | 4.75 |
| Citric acid | 2.5 |
| Sodium cyclamate | .25 |
| Lactose | 6.00 |

Example 8

| | |
|---|---|
| Potassium bicarbonate | 6.9 |
| Potassium chloride | 5.85 |
| Citric acid | 3.0 |
| Sodium cyclamate | .25 |
| Sodium saccharin | .10 |
| Mannitol | 6.00 |

Example 9

| | |
|---|---|
| Potassium bicarbonte | 12.8 |
| Potassium chloride | 9.5 |
| Citric acid | 1.6 |
| Sodium saccharin | 0.5 |
| Sucrose | 0.6 |

Example 10

| | |
|---|---|
| Potassium bicarbonate | 6.9 |
| Potassium chloride | 9.5 |
| Citric acid | 0.86 |
| Sodium saccharin | 0.50 |
| Mannitol | 2.24 |

Example 11

| | |
|---|---|
| Potassium bicarbonate | 12.8 |
| Potassium chloride | 4.75 |
| Citric acid | 1.60 |
| Sodium cyclamate | 2.00 |
| Lactose | 3.85 |

It can be seen from the foregoing examples that when considering the proportion only of potassium bicarbonate to potassium chloride to citric acid to the total of these three constituents that the preferred compositions contain from about 38% to 67% potassium bicarbonate, about 25% to 56% potassium chloride and about 5% to 19% citric acid. Expressed slightly differently, the per dose quantities of the various ingredients should preferably contain from about 0.51 gm. to about 1.28 gm. of potassium bicarbonate, up to about 0.95 gm. potassium chloride and about 0.086 gm. to 0.30 gm. citric acid. In all cases the solution should preferably contain a minimum of 500 mg. of potassium ion (12.8 milliequivalents K+) when the composition is dissolved.

The compositions of these examples are employed in potassium replacement therapy by dissolving them in water. The compositions may be prepared in powder form or compressed into tablets suitable for rapid dissolution in water. Any comfortable ingested quantity of water which is sufficient in volume for dissolving the compositions according to this invention may be employed. Preferably a minimum of one ounce of water per 500 mg. of potassium ion is sufficient.

The recommended dosage prepared from the bulk preparations of the examples would be approximately a 1 to 5 gram tablet or even one level teaspooon (about 2 or 2.5 grams) of the composition for each prescribed administration. The frequency of administration would depend upon the judgment of the physician conducting the therapy.

The foregoing examples are intended to be illustrative only and are indicative of the proportions of the critical ingredients which are necessary for the successful operation of the composition. The total potassium ion equivalent and total chloride ion as well as the proportions of the other ingredients may be varied over wide limits as a matter of choice for one skilled in the art. The preferred range of the potassium bicarbonate and the solid acid, which may be either citric acid or tartaric acid must be considered in relation to the total potassium equivalent present in the composition. The ratio of potassium bicarbonate to acid to total potassium equivalent must be sufficient to produce an amount of carbon dioxide evolution from the total solution which will be effective to mask the salty taste of the solution. The same proportionate relationship may therefore be effectively employed for any total amount of composition prepared.

Sucrose, dextrose, lactose, levulose and mannitol are indicated in the examples but are not essential for the unique functioning of the resultant composition. Any suitable filler material such as levulose which is virtually tasteless or has a pleasant taste and is soluble in water can be employed to provide a convenient amount of dry bulk preferably up to 2 or 3 grams, for ease of preparation, handling and administration of the composition according to this invention.

Various sweeteners are employed both singly or in combination and their amount in any given preparation may be varied over wide limits depending on the taste desired in the resultant solution. The preferred range of sodium saccharin is up to about 0.25 gm. and of sodium cyclamate up to about 1.25 gm., however, any suitable dry, water soluble sweetener may be used. Other materials such as flavoring agents, artificial coloring agents and the like may also be used.

This invention has been described with reference to specific examples, however as indicated, equivalent materials may be substituted for those disclosed and non-critical materials may be added or omitted from the composition according to this invention without departing from the spirit of the described invention or the scope of the appended claims.

The following is claimed:

1. A palatable oral potassium composition for use in potassium replacement therapy without causing gastric disturbance comprising by weight percent about 38% to 67% potassium bicarbonate, about 25% to about 56% potassium chloride and about 5% to about 19% citric acid, the remainder being fillers and sweetening agents.

2. A composition according to claim 1 which is in tablet form and weighs from about one to about 5 grams.

References Cited

Cook, E. F., et al.: "Remington's Practice of Pharmacy," Mack (1948) 9th, pp. 537, 538 and 371.

Jenkins, G. L., et al.; "The Art of Compounding," Blakiston (1957) 9th, pp. 62–64.

ALBERT T. MEYERS, Primary Examiner.

SAM ROSEN, Examiner.

SHELDON J. SINGER, Assistant Examiner.